United States Patent [19]

Gibson et al.

[11] Patent Number: 5,669,355

[45] Date of Patent: Sep. 23, 1997

[54] HYDRAULICALLY-ACTUATED FUEL INJECTOR WITH DIRECT CONTROL NEEDLE VALVE

[75] Inventors: Dennis H. Gibson; Gregory W. Hefler, both of Chillicothe, Ill.

[73] Assignee: Caterpillar Inc., Peoria, Ill.

[21] Appl. No.: 705,393

[22] Filed: Aug. 30, 1996

Related U.S. Application Data

[63] Continuation-in-part of Ser. No. 668,552, Jun. 21, 1996, which is a continuation-in-part of Ser. No. 489,660, Jun. 12, 1995, which is a continuation of Ser. No. 283,232, Jul. 29, 1994, Pat. No. 5,463,996.

[51] Int. Cl.$^6$ .......................... F02M 37/04; F02M 47/02
[52] U.S. Cl. ...................... 123/446; 123/467; 239/96
[58] Field of Search ............................ 123/446, 447, 123/500, 501, 506, 467; 239/88, 585, 96

[56] References Cited

U.S. PATENT DOCUMENTS

| | | | |
|---|---|---|---|
| 4,426,977 | 1/1984 | Taplin et al. | 123/446 |
| 5,025,768 | 6/1991 | Eckert | 123/506 |
| 5,235,954 | 8/1993 | Sverdlin | 123/447 |
| 5,265,804 | 11/1993 | Brunel | 123/506 |
| 5,373,576 | 12/1994 | Ausman et al. | 123/446 |
| 5,441,028 | 8/1995 | Felhofer | 239/96 |
| 5,463,996 | 11/1995 | Maley et al. | 123/446 |
| 5,497,750 | 3/1996 | Mueller et al. | 123/467 |
| 5,507,260 | 4/1996 | Hintzen | 123/299 |
| 5,535,723 | 7/1996 | Gibson et al. | 123/446 |
| 5,551,398 | 9/1996 | Gibson et al. | 123/446 |

OTHER PUBLICATIONS

Author: T.C. Tow; "The Effect Of Multiple Pulse Injection, Injection Rate And Injection Pressure On Particulate And NOx Emissioin From A D.I. Diesel Engine", one hundred forty-seven pages; published in 1993 in the United States.

Authors: T.C. Tow, D.A. Pierpont, R.D. Reitz; "Reducing Particulate and NOx Emissions By Using Multiple Injections In A Heavy Duty D.I. Diesel Engine"; seventeen pages; published Feb. 28, 1994 in the United States.

Authors: N. John Beck, Robert L. Barkhimer, Michael A. Calkins, William P. Johnson, William E. Weseloh; "Direct Digital Control Of Electronic Unit Injectors"; twelve pages; published Feb. 27, 1984 in the United States.

Authors: N. John Beck, S.K. Chen; "Injection Rate Shaping And High Speed Combustion Analysis–New Tools For Diesel Engine Combustion Development"; twenty pages; published Feb. 26, 1990 in the United States.

Authors: R. Racine, M. Miettaux, Y. Drutel, J. Heidt; "Application Of A High Flexible Electronic Injection System To A Heavy Duty Diesel Engine"; fourteen pages; published Feb. 25, 1991 in the United States.

(List continued on next page.)

Primary Examiner—Thomas N. Moulis
Attorney, Agent, or Firm—Liell & McNeil

[57] ABSTRACT

A hydraulically actuated fuel injector includes an injector body having at least one actuation fluid inlet, a needle control chamber, a nozzle chamber, and a nozzle outlet that opens to the nozzle chamber. A hydraulic means within the injector pressurizes fuel in the nozzle chamber. The hydraulic means includes an actuation fluid control valve having a first solenoid and is moveable between an open position in which the actuation fluid inlet is open and a closed position in which the actuation fluid inlet is closed. A needle valve member is positioned to reciprocate in the nozzle chamber between an open position in which the nozzle outlet is open and a closed position in which the nozzle outlet is closed. A needle valve member includes a closing hydraulic surface exposed to pressure in the needle control chamber. A needle control valve having a second solenoid is mounted within the injector body and is moveable between an off position in which the needle control chamber is opened to a source of high pressure fluid and an on position in which the needle control chamber is opened to a low pressure passage.

20 Claims, 7 Drawing Sheets

OTHER PUBLICATIONS

Authors: M. Miyaki, H. Fujisawa, A. Masuda, Y. Yamamoto; "Development Of New Electronically Controlled Fuel Injection System ECE–U2 For Diesel Engines"; seventeen pages; believed to have been published in 1991.

Author; BKM, Inc.; "Servo Jet Electronic Fuel Injection HSV High Speed Solenoid Valves"; four pages; published 1985 in the United States.

Authors: K. Egger, P. Reisenbichler, R. Leonhard; "Common Rail Injection System For Diesel Engines—Analysis, Potential, Future"; twenty–eight pages, which includes original German publication with FIGS.; published Apr. 28, 1994 in Germany.

Author: A. Dolenc; "The Injection Equipment Of Future High–Speed D.I. Diesel Engines With Respect To Power And Pollution Requirements"; ten pages; published Feb. 7, 1990 in Great Britain.

Authors: R. Cihocki, P. Herzog, F. Schweinzer; "Latest Findings In Development Of High–Speed Direct Injection [HSDI] Diesel Engines In Passenger Vehicles"; thirty pages, which includes original German publication with FIGS.; published Apr. 28, 1994 in Germany.

Authors: K. Prescher, W. Bauer, W. Schaffitz; "Common Rail Injection Systems With Characteristics Independent Of Engine Speed And With High Injection Pressure—Diesel Engine Potential For The Future"; thirty–nine pages, which includes original German publication with Figs.; published Apr. 28, 1994 in Germany.

Fig_2

Fig_4

Fig_6_
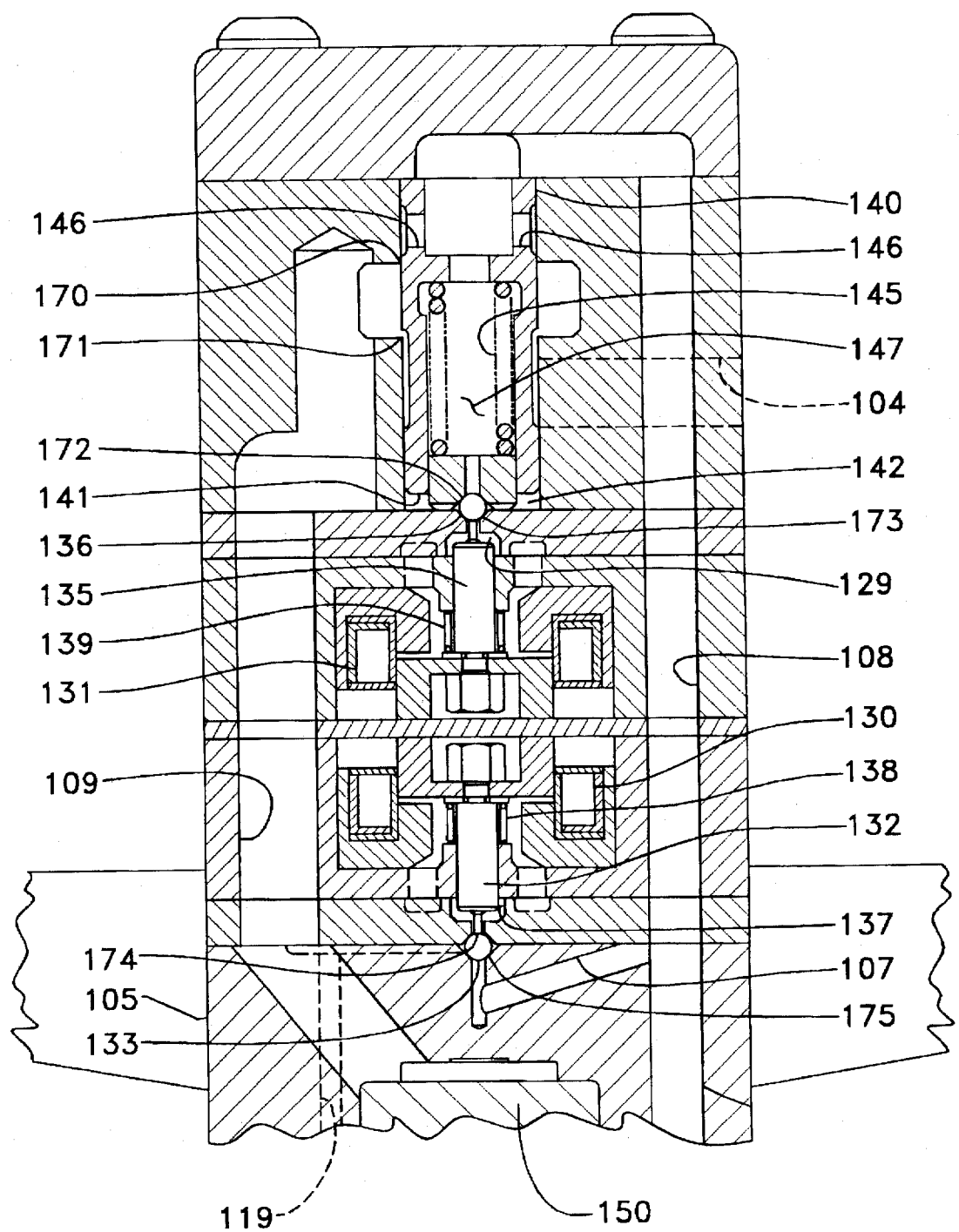

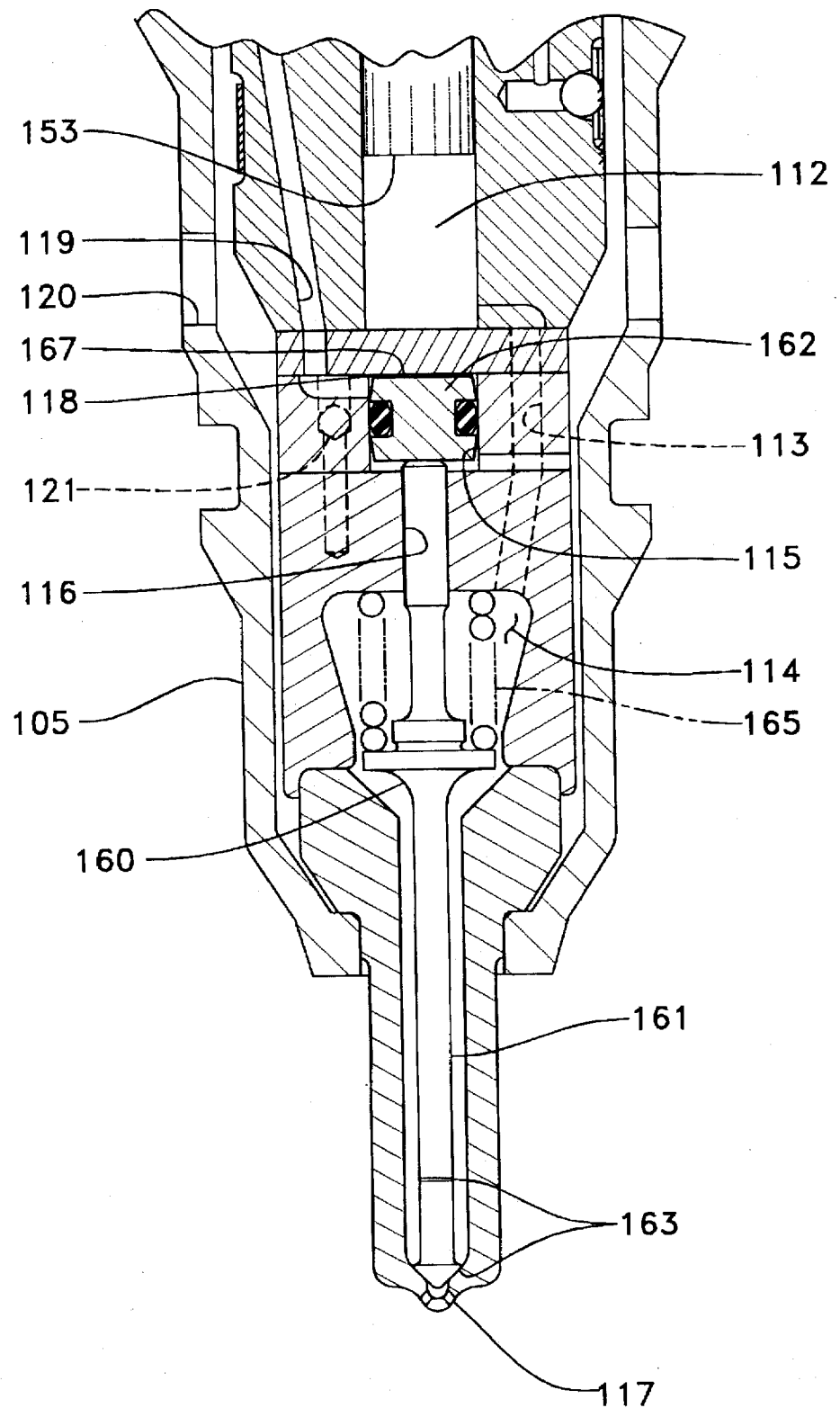
Fig_7_

HYDRAULICALLY-ACTUATED FUEL INJECTOR WITH DIRECT CONTROL NEEDLE VALVE

RELATION TO OTHER PATENT APPLICATIONS

This application is a continuation-in-part of application Ser. No. 08/668,552, filed Jun. 21, 1996, and entitled HYDRAULICALLY-ACTUATED FUEL INJECTOR WITH DIRECT CONTROL NEEDLE VALVE, which was a continuation-in-part of application Ser. No. 08/489,660, filed Jun. 12, 1995 and entitled HYDRAULICALLY-ACTUATED FLUID INJECTOR HAVING PRE-INJECTION PRESSURIZABLE FLUID AND DIRECT-OPERATED CHECK, which was a continuation of application Ser. No. 08/283,232, filed Jul. 29, 1994 with the same title (now U.S. Pat. No. 5,463,996).

TECHNICAL FIELD

The present invention relates generally to fuel injection, and more particularly to hydraulically-actuated fuel injectors with direct control needle valves, and fuel injection systems using same.

BACKGROUND ART

Known hydraulically-actuated fuel injection systems and/or components are shown, for example, in U.S. Pat. Nos. 5,121,730 issued to Ausman et al. on Jun. 16, 1992; 5,271,371 issued to Meints et al. on Dec. 21, 1993; and 5,297,523 issued to Hafner et al. on Mar. 29, 1994. In these hydraulically actuated fuel injectors, a spring biased needle check opens to commence fuel injection when pressure is raised by an intensifier piston/plunger assembly to a valve opening pressure. The intensifier piston is acted upon by a relatively high pressure actuation fluid, such as engine lubricating oil, when a solenoid driven actuation fluid control valve opens the injector's high pressure inlet. Injection is ended by deactivating the solenoid to release pressure above the intensifier piston. This in turn causes a drop in fuel pressure causing the needle check to close under the action of its return spring and end injection. While these hydraulically actuated fuel injectors have performed magnificently over many years, there remains room for improvement, especially in the area of shaping an injection rate trace from beginning to end to precisely suit a set of engine operating conditions.

Over the years, engineers have discovered that engine emissions can be significantly reduced at certain operating conditions by providing a particular injection rate trace. In many cases emissions are improved when the initial injection rate is controllable, and when there is a nearly vertical abrupt end to injection. While these prior hydraulically actuated fuel injection systems have some ability to control the injection rate shape, there remains room to improve the ability to control injection rate shape with hydraulically actuated fuel injection systems.

The present invention is intended to improve the ability of hydraulically actuated fuel injectors to better control an injection rate shape during each injection event.

DISCLOSURE OF THE INVENTION

A hydraulically-actuated fuel injector includes an injector body having at least one actuation fluid inlet, a needle control chamber, a nozzle chamber and a nozzle outlet that opens to the nozzle chamber. A hydraulic means within the injector pressurizes fuel within the nozzle chamber. The hydraulic means includes an actuation fluid control valve having a first solenoid and being moveable between an open position in which the at least one actuation fluid inlet is open and a closed position in which the actuation fluid inlet is closed. A needle valve member is positioned to reciprocate in the nozzle chamber between an opened position in which the nozzle outlet is open and a closed position in which the nozzle outlet is closed. The needle valve member includes a closing hydraulic surface exposed to pressure in the needle control chamber. A needle control valve has a second solenoid mounted within the injector body and is moveable between an off position in which the needle control chamber is opened to a source of high pressure fluid and an on position in which the needle control chamber is opened to a low pressure passage.

In another embodiment of the present invention, a fuel injection system includes a plurality of hydraulically-actuated fuel injectors with direct control needle valves. Each injector has a hydraulic means for pressurizing fuel that includes an actuation fluid control valve with a first solenoid. A needle valve member with a closing hydraulic surface is exposed to pressure in a needle control chamber, and a needle control valve with a second solenoid alternately opens the needle control chamber to a source of high pressure fluid or a low pressure passage. Finally, each injector also includes an actuation fluid inlet, an actuation fluid drain, and a fuel supply passage. A source of fuel is connected to the fuel supply passage of each injector. A source of high pressure actuation fluid is connected to the actuation fluid inlet of each injector. A low pressure reservoir is connected to the actuation fluid drain of each injector. Finally, a computer is in communication with, and capable of independently controlling, the needle control valve and the actuation fluid control valve.

One object of the present invention is to provide an improved hydraulically-actuated fuel injector with a direct control needle valve member.

BRIEF DESCRIPTION OF THE DRAWINGS

FIG. 6 is a partial sectioned side elevational view of an upper portion of the fuel injector shown in FIG. 5.

FIG. 7 is a partial sectioned side elevational view of the lower portion of the injector shown in FIG. 5.

BEST MODE FOR CARRYING OUT THE INVENTION

Figure 1:
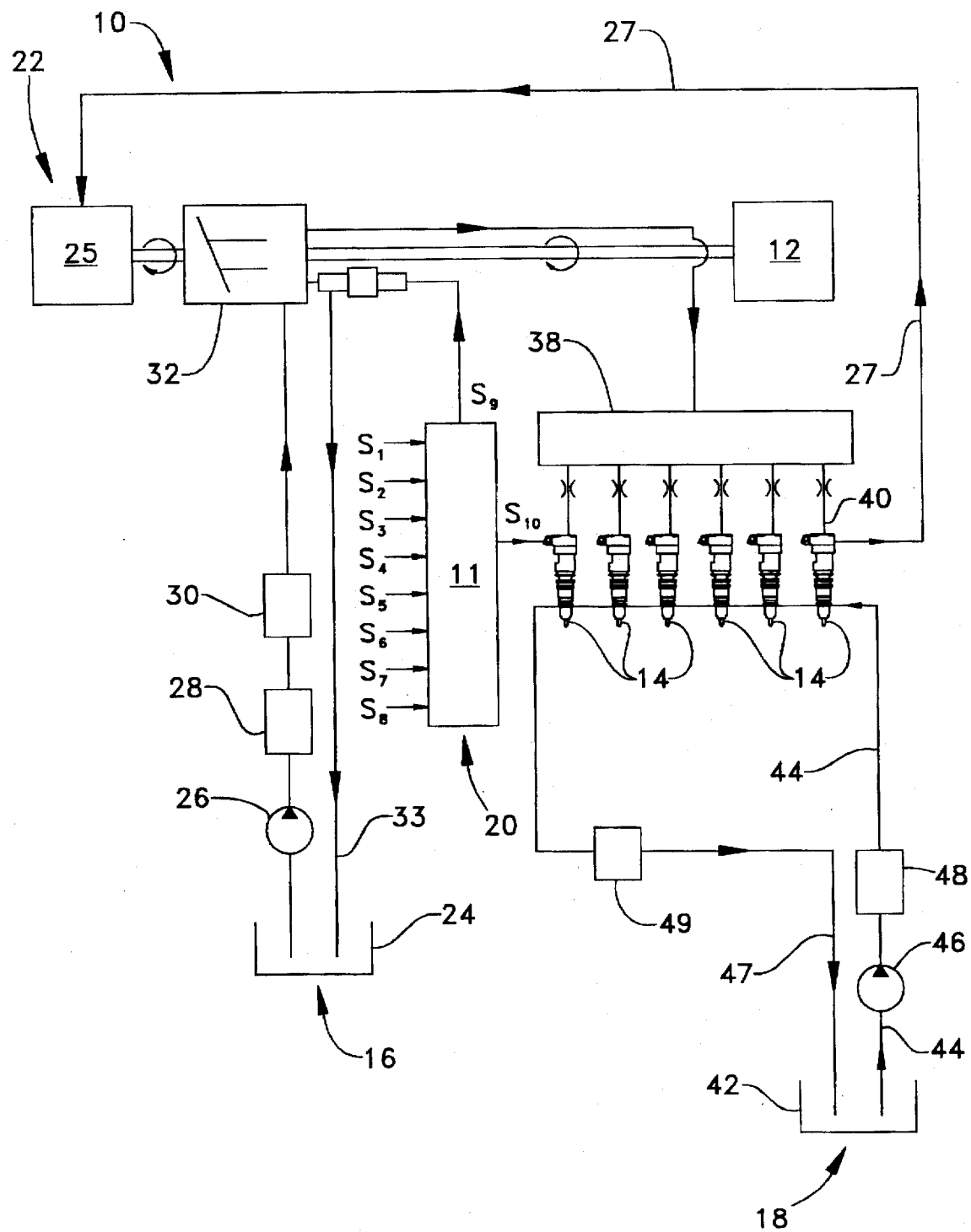
FIG. 1 is a schematic view of a hydraulically-actuated electronically-controlled fuel injection system according to the present invention.

Referring now to FIG. 1, there is shown an embodiment of a hydraulically-actuated electronically-controlled fuel injection system 10 in an example configuration as adapted for a direct-injection diesel-cycle internal combustion engine 12. Fuel system 10 includes one or more hydraulically-actuated electronically-controlled fuel injectors 14, which are adapted to be positioned in a respective cylinder head bore of engine 12. Fuel system 10 includes an apparatus or means 16 for supply actuating fluid to each injector 14, an apparatus or means 18 for supplying fuel to each injector, a computer 20 for electronically controlling the fuel injection system and an apparatus or means 22 for re-circulating actuation fluid and for recovering hydraulic energy from the actuation fluid leaving each of the injectors.

The actuating fluid supply means 16 preferably includes an actuating fluid sump 24, a relatively low pressure actuating fluid transfer pump 26, an actuating fluid cooler 28, one or more actuation fluid filters 30, a high pressure pump 32 for generating relatively high pressure in the actuation fluid and at least one relatively high pressure actuation fluid manifold 36. A common rail passage 38 is arranged in fluid communication with the outlet from the relatively high pressure actuation fluid pump 32. A rail branch passage 40 connects the actuation fluid inlet of each injector 14 to the high pressure common rail passage 38.

Actuation fluid leaving the actuation fluid drain 52, 54 (see FIG. 2) of each injector 14 enters a re-circulation line 27 that carries the same to the hydraulic energy re-circulating or recovering means 22. A portion of the re-circulated actuation fluid is channeled to high pressure actuation fluid pump 32 and another portion is returned to actuation fluid sump 24 via re-circulation line 33.

Any available engine fluid is preferably used as the actuation fluid in the present invention. However, in the preferred embodiments, the actuation fluid is engine lubricating oil and the actuation fluid sump 24 is an engine lubrication oil sump. This allows the fuel injection system to be connected as a parasitic subsystem to the engine's lubricating oil circulation system. Alternatively, the actuation fluid could be fuel provided by a fuel tank 42 or another source, such as coolant fluid, etc.

The fuel supply means 18 preferably includes a fuel tank 42, a fuel supply passage 44 arranged in fluid communication between fuel tank 42 and the fuel inlet 60 (FIG. 2) of each injector 14, a relatively low pressure fuel transfer pump 46, one or more fuel filters 48, a fuel supply regulating valve 49, and a fuel circulation and return passage 47 arranged in fluid communication between injectors 14 and fuel tank 42.

The computer 20 preferably includes an electronic control module 11 which controls 1) the fuel injection timing; 2) the total fuel injection quantity during an injection cycle; 3) the fuel injection pressure; 4) the number of separate injections or injection segments during each injection cycle; 5) the time intervals between the injection segments; 6) the fuel quantity of each injection segment during an injection cycle; 7) the actuation fluid pressure; and 8) any combination of the above parameters. Computer 20 receives a plurality of sensor input signals $S_1$–$S_8$, which correspond to known sensor inputs, such as engine operating condition, load, etc., that are used to determine the precise combination of injection parameters for a subsequent injection cycle. In this example, computer 20 issues control signal $S_9$ to control the actuation fluid pressure and a control signal $S_{10}$ to control the fluid control valve(s) within each injector 14. Each of the injection parameters are variably controllable independent of engine speed and load.

Figure 2:
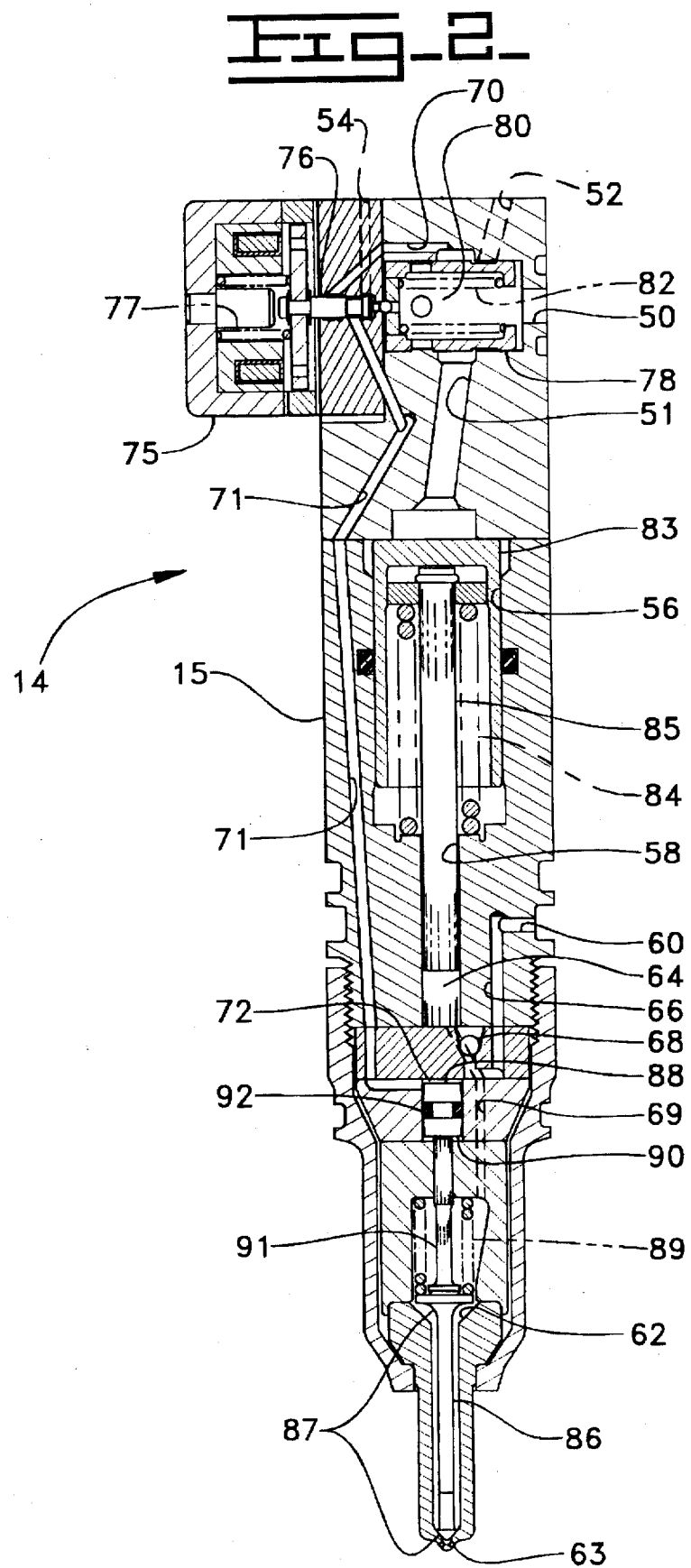
FIG. 2 is a sectioned side elevational view of a fuel injector.
Figure 3:
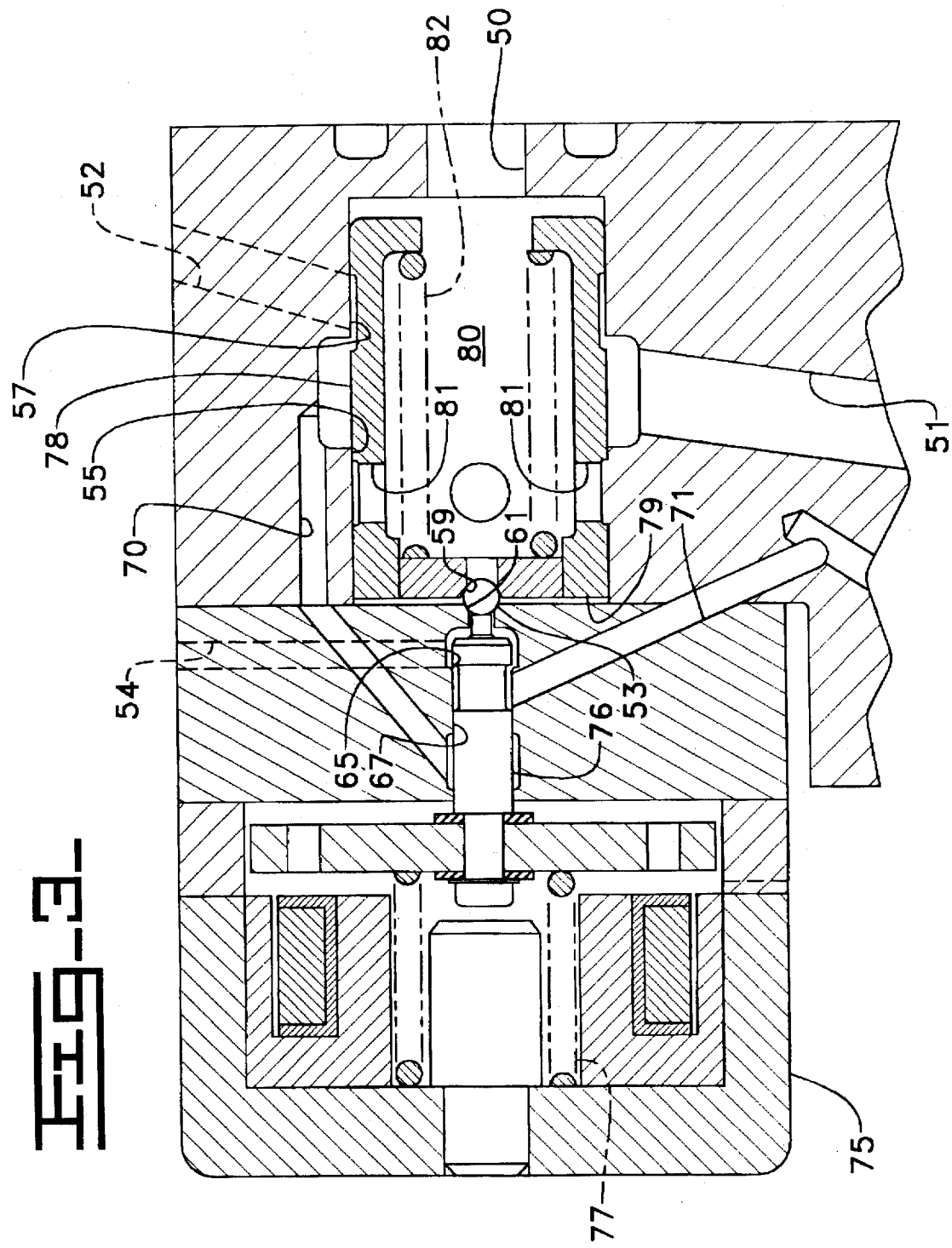
FIG. 3 is a partial sectioned side elevational view of an upper portion of the fuel injector shown in FIG. 2.
Figure 4:
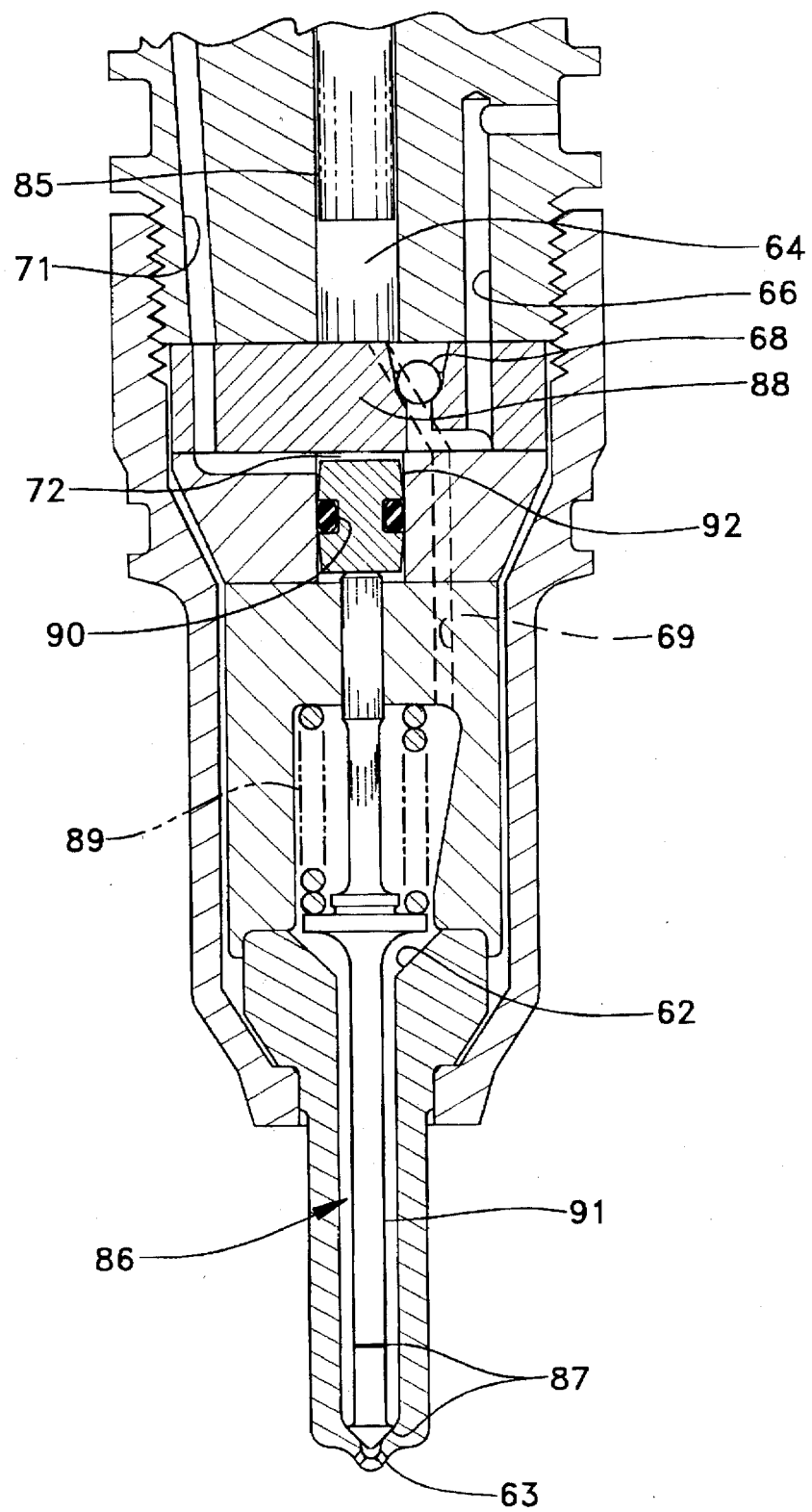
FIG. 4 is a partial sectioned side elevational view of the lower portion of the injector shown in FIG. 2.

Referring now to FIGS. 2–4, a fuel injector 14 with a single three-way solenoid 75 is shown. Injector 14 includes an injector body 15 having an actuation fluid inlet 50 that is connected to a branch rail passage 40, actuation fluid drains 52 and 54 that are connected to actuation fluid recirculation line 27 and a fuel inlet 60 connected to a fuel supply passage 44. (See FIG. 1). Injector 14 includes a hydraulic means for pressurizing fuel within the injector during each injection event and a needle control valve that controls the opening and closing of nozzle outlet 63.

The hydraulic means for pressurizing fuel includes an actuation fluid control valve that alternately opens actuation fluid cavity 51 to the high pressure of actuation fluid inlet 50 or the low pressure of actuation fluid drain 52. The actuation fluid control valve includes a three-way solenoid 75 attached to a pin spool valve member 76. An intensifier spool valve member 78 responds to movement of pin spool valve member 76 to alternately open actuation fluid cavity 51 to actuation fluid inlet 50 or low pressure drain 52. The hydraulic pressurizing means also includes actuation fluid cavity 51 that opens to a piston bore 56, within which an intensifier piston 83 reciprocates between a return position (as shown) and a forward position. Injector body 15 also includes a plunger bore 58, within which a plunger 85 reciprocates between a retracted position (as shown) and an advanced position. A portion of plunger bore 58 and plunger 85 define a fuel pressurization chamber 64, within which fuel is pressurized during each injection event. Plunger 85 and intensifier piston 83 are returned to their retracted positions between injection events under the action of compression spring 84. Thus, the hydraulic means for pressurizing fuel includes the fuel pressurization chamber 64, plunger 85, intensifier piston 83, actuation fluid inlet 50, actuation fluid cavity 51 and the various components of the actuation fluid control valve, which includes solenoid 75, pin spool valve member 76, ball 53 and intensifier spool valve member 78, etc.

Fuel enters injector 14 at fuel inlet 60 and travels along fuel supply passage 66, past ball check valve 68 and into fuel pressurization chamber 64, when plunger 85 is retracting. Ball check 68 prevents the reverse flow of fuel from fuel pressurization chamber 64 into fuel supply passage 66 during the plunger's downward stroke. Unused fuel is re-circulated from each injector via a return opening 74. Pressurized fuel travels from fuel pressurization chamber 64 via a connection passage 69 to nozzle chamber 62. A needle valve member 86 moves within nozzle chamber 62 between an open position in which nozzle outlet 63 is opened and a closed position in which nozzle outlet 63 is closed. Needle valve member 86 is mechanically biased to its closed position by a compression spring 89.

Needle valve member 86 includes opening hydraulic surfaces 87 exposed to fluid pressure within nozzle chamber 62 and a closing hydraulic surface 88 exposed to fluid pressure within a needle control chamber 72. Needle valve member 86 includes a needle portion 91 and an intensifier portion 92 that are shown as separate pieces for ease of manufacturing, but both portions could be machined as a single integral component.

It should be appreciated that pressurized fuel acts upon the opening hydraulic surfaces 87 whereas actuation fluid acts upon the closing hydraulic surface 88. Preferably, the closing hydraulic surface and the opening hydraulic surface are sized and arranged such that the needle valve member 86 is hydraulically biased toward its closed position when the needle control chamber is open to a source of high pressure fluid. Thus, in order to maintain direct control of needle valve member 86 despite high fuel pressure within nozzle chamber 62, there should be adequate pressure on the closing hydraulic surface 88 to maintain nozzle outlet 63 closed. When needle control chamber 72 is opened to a low pressure passage, needle valve member 86 performs as a simple check valve of a type known in the art, in that it opens when fuel pressure acting upon opening hydraulic surfaces 87 is greater than a valve opening pressure sufficient to overcome return spring 89. Thus, opening hydraulic surfaces 87 and closing hydraulic surface 88 are preferably sized and arranged such that the needle valve member is hydraulically biased toward its open position when the needle control chamber is connected to a low pressure passage and the fuel pressure within the nozzle chamber is greater than the valve opening pressure.

In this injector, pin spool valve member 76 is not only considered part of the actuation fluid control valve, but also acts as the needle control valve to alternately open actuation fluid control passage 71 to the high pressure of actuation fluid inlet 50 or the low pressure in actuation fluid drain 54. Thus, the needle control valve aspect of this injector includes all of the components previously described as being part of the actuation fluid control valve. In this case, needle control chamber 72 and actuation fluid control passage 71, along with the other components and passages previously described, constitute a needle control valve for fuel injector 14. One can control the opening and closing of nozzle outlet 63 when fuel is above a valve opening pressure by controlling the exposure of closing hydraulic surface 88 to either a source of high pressure fluid or a low pressure passage.

Actuation fluid control passage 71 is alternately opened to actuation fluid inlet 50 or actuation fluid drain 54 by the movements of pin spool valve member 76 and intensifier spool valve member 78. Thus, in this injector, actuation fluid drain 54 constitutes a low pressure passage and actuation fluid inlet 50 constitutes a source of high pressure fluid. Intensifier spool valve member 78 is biased by a compression spring 82 from a closed position, as shown, toward an open position. When intensifier spool valve member 78 is in its closed position as shown, actuation fluid cavity 51 is closed to actuation fluid inlet 50, but open to low pressure actuation fluid drain 52. When intensifier spool valve member 78 moves under the action of compression spring 82 to its open position, actuation fluid cavity 51 is opened to actuation fluid inlet 50 and closed to drain 52. The position of intensifier spool valve member 78 is controlled by three position solenoid 75, which is capable of moving actuation pin spool valve member 76 between a first position, a second position, and a third position against the action of compression spring 77.

When solenoid 75 is de-energized, as shown, compression spring 77 pushes pin spool valve member 76 to the right to its first position in which actuation fluid control passage 71 is opened to second low pressure actuation fluid drain 54 past seat 65. At the same time, pin spool valve member 76 pushes ball 53 to close seat 59 and open seat 61 so that the end hydraulic surface 79 of intensifier spool valve member 78 is exposed to the low pressure of second drain 54. This causes the high pressure actuation fluid acting on the other end of intensifier spool valve member 78 to hold it in its closed position as shown against the action of compression spring 82. Thus, when solenoid 75 is de-energized, actuation fluid cavity is open to actuation fluid drain 52 and closed to actuation fluid inlet 50.

When solenoid 75 is energized with a full or pull-in current, pin spool valve member 76 is pulled to the left against its stop to a second position. When this occurs, the high pressure actuation fluid pushes ball 53 off of seat 59 to close seat 61. This causes intensifier spool valve member 78 to become hydraulically balanced and it moves toward the right to its open position under the action of compression spring 82. At the same time, pin spool valve member 76 closes control passage 71 to second drain 54 and opens actuation fluid control passage 71 to a transfer passage 70, which is open to the high pressure in actuation fluid cavity 51.

When solenoid 75 is energized with a medium or hold-in current, pin spool valve member 76 moves slightly to the right to a third position that is a sufficient distance to close actuation fluid control passage 71 to the high pressure in transfer passage 70 and re-open the same to low pressure drain 54. However, the hold-in current is not sufficient to cause any change in the position of intensifier spool valve member 78, which remains in its open position with actuation fluid cavity 51 open to high pressure actuation fluid inlet 50. When intensifier spool valve member 78 is in its open position, actuation fluid flows through inlet 50 into the hollow interior 80 of intensifier spool valve member 78, through radial openings 81, and then simultaneously into connection passage 70 and actuation fluid cavity 51.

Figure 5:
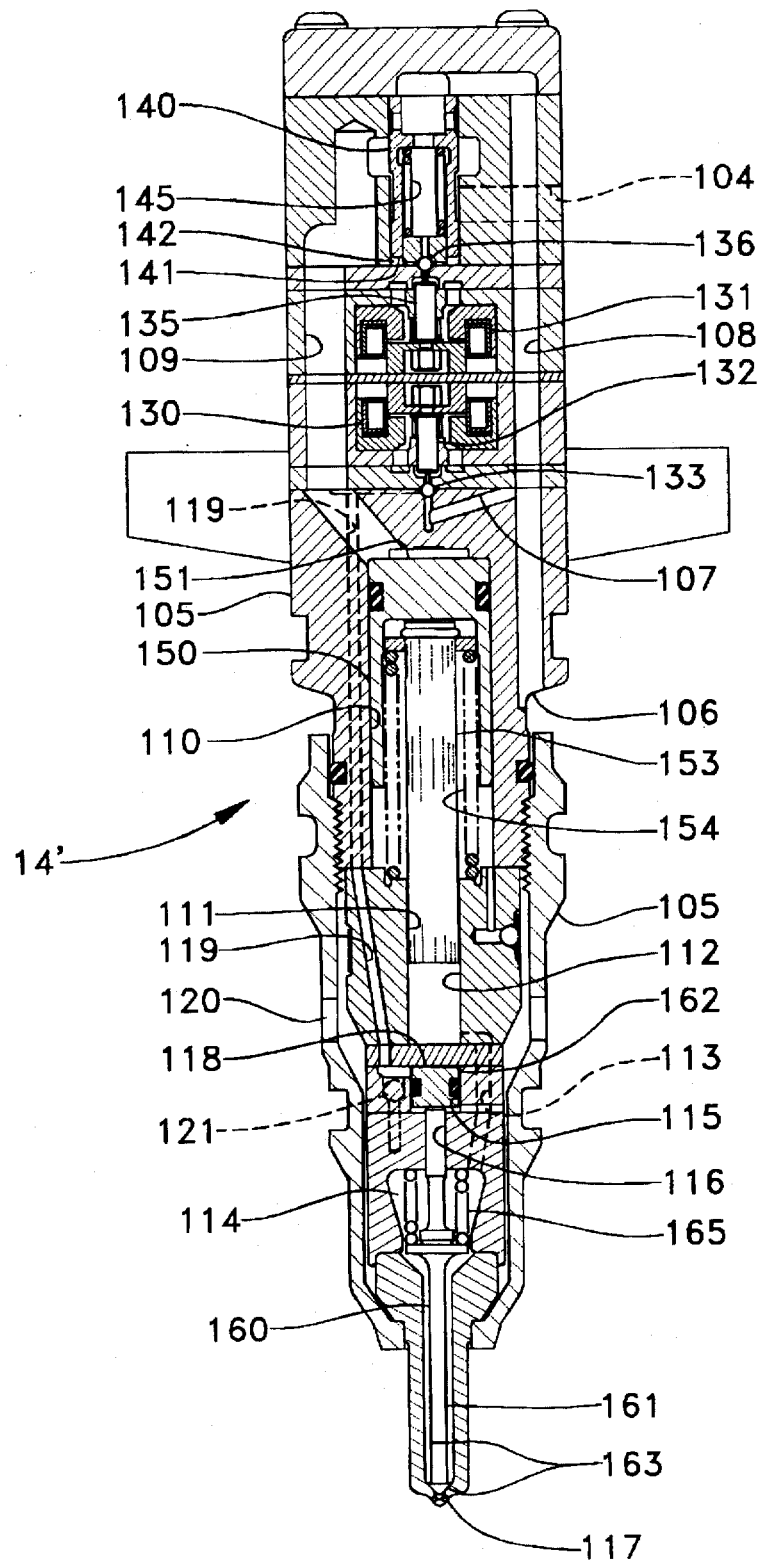
FIG. 5 is a sectioned side elevational view of a fuel injector according to the present invention.

Referring now to FIGS. 5–7, a dual two-way solenoid fuel injector 14' is presented as an alternative to the single three-way solenoid fuel injector 14 just described. Fuel injector 14' utilizes a first two-way solenoid 131 to alternately open actuation fluid cavity 109 to actuation fluid inlet 106 or low pressure actuation fluid drain 104, and uses a second two-way solenoid 130 to independently control the exposure of a needle control chamber 118 to a low pressure passage or a source of high pressure fluid. Fuel injector 14' could be substituted in for the injectors 14 shown in. FIG. 1 since both injectors perform substantially similar while one uses a single three-way solenoid and the other uses a pair of two-way solenoids to accomplish the same tasks.

Injector 14' includes an injector body 105 having an actuation fluid inlet 106 that is connected to a branch rail passage 40, an actuation fluid drain 104 that is connected to actuation fluid recirculation line 27 and a fuel inlet 120 connected to a fuel supply passage 44. (See FIG. 1). Injector 14' includes a hydraulic means for pressurizing fuel within the injector during each injection event and a separate and independent needle control valve that controls the opening and closing of nozzle outlet 63.

The hydraulic means for pressurizing fuel includes an actuation fluid control valve that includes two-way solenoid 131 which is attached to a pin 135. An intensifier spool valve member 140 responds to movement of pin 135 and ball valve member 136 to alternately open actuation fluid cavity 109 to actuation fluid inlet 106 or low pressure drain 104. Actuation fluid cavity 109 opens to a piston bore 110 within which an intensifier piston 150 reciprocates between a return position (as shown) and a forward position. Injector body 105 also includes a plunger bore 111, within which a plunger 153 reciprocates between a retracted position (as shown) and an advanced position. A portion of plunger bore 111 and plunger 153 define a fuel pressurization chamber 112, within which fuel is pressurized during each injection event. Plunger 153 and intensifier piston 150 are returned to their retracted positions between injection events under the action of compression spring 154. Thus, the hydraulic means for pressurizing fuel includes the fuel pressurization chamber 112, plunger 153, intensifier piston 150, actuation fluid inlet 106, actuation fluid cavity 109 and the various components of the actuation fluid control valve, which includes first solenoid 131, ball 136, pin 135 and intensifier spool valve member 140.

Fuel enters injector 14' at fuel inlet 120 and travels along a hidden fuel supply passage, past ball check 121 into fuel pressurization chamber 112, when plunger 153 is retracting. Ball check 121 prevents the reverse flow of fuel from fuel pressurization chamber 112 into the fuel supply passage during the plunger's downward stroke. Pressurized fuel travels from fuel pressurization chamber 112 via a connection passage 113 to nozzle chamber 114. A needle valve member 160 moves within nozzle chamber 114 between an open position in which nozzle outlet 117 is open and a closed position in which nozzle outlet 117 is closed. Like the earlier embodiment, needle valve member 160 includes a lower needle portion 161 and an upper intensifier portion 162 that are machined from separate components but could equally well be machined as a single integral piece. Needle valve member 160 is biased to its closed position by a compression spring 165.

Needle valve member 160 includes opening hydraulic surfaces 163 exposed to fluid pressure within nozzle chamber 114 and a closing hydraulic surface 167 exposed to fluid pressure within needle control chamber 118. As in the previous embodiment the closing hydraulic surface and the opening hydraulic surfaces are sized and arranged such that the needle valve member 160 is hydraulically biased toward its closed position when the needle control chamber 118 is open to a source of high pressure fluid. Thus, there should be adequate pressure on the closing hydraulic surface 167 to maintain nozzle outlet 117 closed despite the presence of high pressure fuel in nozzle chamber 114 that is otherwise above a valve opening pressure. The opening hydraulic surfaces 163 and closing hydraulic surface 167 are also preferably sized and arranged such that needle valve member 160 is hydraulically biased toward its open position when the needle control chamber 118 is connected to a low pressure passage and the fuel pressure within nozzle chamber 114 is greater than the valve opening pressure.

The actuation fluid control valve of injector 14' can be thought of as including first two-way solenoid 131, which is attached to a pin 135 in contact with ball 136 and biased by a compression spring 139 toward a retracted position. In this position, ball 136 closes seat 173 and opens seat 172 so that high pressure actuation fluid flows into contact with the end hydraulic surface 141 of intensifier spool valve member 140 in intensifier spool control chamber 142. When solenoid 131 is de-energized, actuation fluid cavity 109 is opened to actuation fluid drain 104 past seat 171, and intensifier spool valve member 78 hydraulically balanced and forced to one side, as shown, to close seat 170 and open seat 171. When first solenoid 131 is energized, pin 135 moves upward causing ball 136 to open seat 173 and close seat 172. This causes end hydraulic surface 141 to be exposed to the low pressure in drain passage 129, which is connected to a second actuation fluid drain, which is hidden from view but merges with actuation fluid drain 104 at recirculation line 27. This creates a hydraulic imbalance in intensifier spool valve member 140 causing it to move downward against the action of compression spring 145 to close seat 171 and open seat 170. This allows actuation fluid to flow along high pressure passage 108 into the hollow interior 147 of intensifier spool valve member 140, through radial openings 146, past seat 170 and into actuation fluid cavity 109 to act upon the top of the intensifier piston 150.

The opening and closing of the nozzle outlet 117 via needle valve member 160 is controlled by needle control valve that includes a second solenoid 130. When de-energized, a pin 132, which is attached to first solenoid 130, retracts under the action of compression spring 138 so that high pressure actuation fluid flowing through passage 107 pushes ball 133 to open seat 175 and close seat 174. When in this configuration, the high pressure actuation fluid passage 107, which is connected to actuation fluid inlet 106, flows along a hidden passage into actuation fluid control passage 119. Actuation fluid control passage 119 opens to needle control chamber 118 and allows high pressure actuation fluid to act upon the closing hydraulic surface 167 of needle valve member 160, pushing the same downward to close nozzle outlet 117. When second solenoid 130 is energized, pin 132 is moved downward causing ball 133 to close seat 175 and open seat 174. This opens actuation fluid control passage 119 to the low pressure within drain passage 137, which is connected to a hidden third actuation fluid drain that merges with actuation fluid drain 104 in recirculation line 27. Thus, with the solenoid 130 energized, the closing hydraulic surface 167 of needle valve member 160 is now exposed to a low pressure passage and the needle valve member begins to behave like a simple check valve in that it will now open if fuel pressure within the nozzle chamber 114 is greater than a valve opening pressure sufficient to overcome return spring 165. In this embodiment, the needle control valve includes second solenoid 130, pin 135, ball 133, seat 172 and seat 173.

INDUSTRIAL APPLICABILITY

Referring now to the fuel injector 14 illustrated in FIGS. 2–4, each injection sequence is started by applying pull-in current to solenoid 75 in order to move pin spool valve member 76 to the left. Oil pressure that entered the injector and was trapped at seat 59 is now able to push ball valve 53 to close seat 61. High pressure oil can flow past seat 59 through cross grooves in the back side of intensifier spool valve member 78 to act on end hydraulic surface 79. The intensifier spool valve member 78 is now pressure balanced and spring 82 moves it to the right. This opens seat 55 and closes seat 57. The main oil supply can flow through radial openings 81, past seat 55, into actuation fluid cavity 51 to the top of intensifier piston 83, starting it moving downward. Oil is also flowing through a connection passage 70 to the pin spool valve member 76. With the movement of pin spool valve member 76, seat 67 opens and seat 65 closes causing the high pressure in transfer passage 70 to be connected to actuation fluid control passage 71. The high pressure acting on closing hydraulic surface 88 holds needle valve member 86 in its closed position. With intensifier piston 83 and plunger 85 moving downward, fuel pressure starts to build within fuel pressurization chamber 64, closing ball check 65.

In order to provide direct control of needle valve member 86, the solenoid pull-in current is reduced to its hold-in current after fuel pressure reaches valve opening pressure. By providing two force levels from the solenoid (pull-in and hold-in) a different injection characteristic takes place. Dropping back to a hold-in current from the initial pull-in current causes the pin spool valve member 76 to close seat 67 and open seat 65. Hold-in current will provide enough force to prevent the solenoid spring 77 from pushing ball valve 53 off of seat 61. The high pressure oil can no longer flow past seat 67 into actuation fluid control passage 71 to pressurize needle control chamber 72. If the solenoid hold-in current is maintained, fuel pressure within nozzle chamber 62 will build via its connection passage 69 to fuel pressurization chamber 64 until a valve opening pressure (VOP) is reached and the needle valve member opens against the action of needle return spring 89.

With the full pull-in current being applied, fuel pressure continues to build from the intensifier piston 83 and plunger 85 moving downward (or stopped at a point where the fuel is fully compressed rendering the plunger hydraulically locked), but the needle valve member 86 will not open because high pressure oil is allowed to flow into needle control chamber 72 to act on closing hydraulic surface 88 of needle valve member 86. This pressure on needle valve member 86 provides a force required to keep it closed. To open needle valve member 86, solenoid 75 changes from pull-in current to its lower hold-in current. The needle control chamber is opened to the low pressure of drain 54 past seat 65. This removes the force keeping the needle valve member closed, and now it opens allowing fuel to exit nozzle chamber 62 through nozzle outlet 63. Fuel injection can be paused or temporarily halted by returning the solenoid current to its pull-in level. This re-pressurizes the closing hydraulic surface 88 of needle valve member 86 causing it to close. This direct control of needle valve member 86 allows the nozzle outlet to be opened and closed any number of times during each injection cycle without affecting the hydraulic pressurizing means.

To end injection and allow the injector to refuel itself for the next cycle, solenoid 75 is de-energized. This causes actuation pin spool valve member 76 to close seat 67 and open seat 65. This releases the pressurized oil acting on closing hydraulic surface 88. The solenoid spring 77 causes the actuation valve member 76 to push ball valve 53 from seat 61 back to close seat 59. The high pressure oil supply is closed off at seat 59 and oil pressure on the hydraulic end surface 79 of intensifier spool valve member 78 is released past seat 61 to low pressure drain 54. Intensifier spool valve member 78 is again hydraulically unbalanced causing it to move left against the action of spring 82 to close seat 55 and open seat 57. This releases pressurized oil acting on top of intensifier piston 83 by opening actuation fluid cavity 51 to low pressure drain 52 past seat 57. The intensifier piston 83 and plunger 84 are then returned upward by return spring 84. The lowering fuel pressure causes ball check 68 to open and allow replenishing fuel to flow into fuel pressurization chamber 64.

Changing the current levels from pull-in to hold-in creates true freedom for delivering fuel during the injection cycle. An injection characteristic tailored to specific engine operating conditions can be obtained. This injection system provides the ability to vary injection pressures by controlling the pressure of the actuation fluid and provides the ability to control injection characteristics through the direct control of the needle valve member. The direct control of the needle valve member allows the computer to control when the needle valve member is opened at any pressure between valve opening pressure and a maximum injection pressure. This provides a significant amount of control over initial injection mass flow rate in order to produce some rate shaping, if desired. At the same time, the direct control aspects of the present invention allow for a desirable abrupt end to injection by providing the means by which the needle valve member can be quickly closed at any desired time.

Referring now to the injector 14' illustrated in FIGS. 5–7, each injection sequence is started by energizing the first solenoid 131 in order to move ball 136 to open seat 173 and close seat 172. Oil acting on the end hydraulic surface 141 of intensifier spool valve member 140 can now escape past seal 173 to a low pressure drain. Intensifier spool valve member 140 is now hydraulically imbalanced and begins to move downward against the action of compression spring 145. This opens seat 170 and closes seat 171. The main oil supply can now flow through radial openings 146, past seat 170, into actuation fluid cavity 109 to the top of intensifier piston 150, starting it moving downward. The second solenoid 130 remains de-energized so that oil pressure holds ball 133 in a position that closes seat 174 and opens seat 175. Needle valve member 160 is held closed since the high pressure oil can flow through high pressure passage 107, past seat 175, through actuation fluid control passage 119 and into needle control chamber 118. With intensifier piston 150 and plunger 153 moving downward, fuel pressure starts to build within fuel pressurization chamber 112, closing ball check 121.

When fuel pressurization chamber 112 has reached a desired magnitude, the second solenoid 130 is energized causing pin 132 to move downward pushing ball 133 to close seat 175 and open seat 174. Actuation fluid control passage 119 is now open to low pressure drain passage 137 relieving the pressure on the closing hydraulic surface 167 of needle valve member 160. At this point, if fuel pressure within nozzle chamber 114 is above a valve opening pressure sufficient to overcome return spring 165, the needle valve member will lift to its open position to open nozzle outlet 117. Needle valve member 160 can be closed at any time by simply de-energizing second solenoid 130 to re-open seat 175 and re-expose closing hydraulic surface 167 to high pressure actuation fluid.

To end injection and allow the injector to re-fuel itself for the next cycle, both solenoids 130 and 131 are de-energized. This causes ball 133 to close seat 174 and open seat 175, while upper ball 136 opens seat 172 and closes seat 173. De-energizing of second solenoid 130 resumes the pressurized oil acting on closing hydraulic surface 167 and with the help of return spring 165 maintains needle valve member 160 closed. De-energization of first solenoid 131 opens seat 172 causing intensifier spool valve member 140 to again become hydraulically balanced so that compression spring 145 moves the same upward to close seat 170 and open seat 171. This allows actuation fluid in actuation fluid cavity 109 to drain into actuation fluid drain 104 so that intensifier piston 150 and plunger 153 can retract under the action of return spring 154. The lowering of fuel pressure within fuel pressurization chamber 112 causes ball check 121 to open. Replenishing fuel begins to flow into the injector for the next injection event.

The subject invention is capable of varying peak fuel injection pressure independent of engine speed and load. The subject invention is capable of variably controlling the fuel quantity of each separate fuel injection segment during an injection cycle. The invention is also capable of variably controlling each time interval between each separate fuel injection segment during an injection cycle. Those skilled in the art will appreciate that valve control signal $S_{10}$ is actually two separate signals and $S_{10b}$ for the actuation fluid control valve and the needle control valve, respectively. Moreover, the injector solenoid(s) can be energized and de-energized once or a selected plurality of times during an injection cycle to produce one or a variably-selected plurality of injection segments.

Other aspects, objects, and advantages of this invention can be obtained from a study of the drawings, the disclosure, and the appended claims.

We claim:

1. A hydraulically actuated fuel injector comprising:
   an injector body having at least one actuation fluid inlet, a needle control chamber, a nozzle chamber and a nozzle outlet that opens to said nozzle chamber;
   hydraulic means, within said injector, for pressurizing fuel in said nozzle chamber, said hydraulic means including an actuation fluid control valve having a first solenoid and being movable between an open position in which said at least one actuation fluid inlet is open and a closed position in which said actuation fluid inlet is closed;
   a needle valve member positioned to reciprocate in said nozzle chamber between an opened position in which said nozzle outlet is open and a closed position in which said nozzle outlet is closed, said needle valve member including a closing hydraulic surface exposed to pressure in said needle control chamber;

a needle control valve having a second solenoid mounted within said injector body, and being movable between an off position in which said needle control chamber is opened to a source of high pressure fluid and an on position in which said needle control chamber is opened to a low pressure passage.

2. The fuel injector of claim 1, wherein said source of high pressure fluid is an actuation fluid inlet;

said injector body includes at least one actuation fluid drain; and said low pressure passage is an actuation fluid drain.

3. The fuel injector of claim 2, wherein said first solenoid and said second solenoid are two-way solenoids.

4. The fuel injector of claim 3 wherein said injector body includes an actuation fluid control passage extending between said needle control chamber and said needle control valve;

said needle control valve includes a pin attached to said second solenoid, said injector body having a low pressure seat between said actuation fluid drain and said actuation fluid control passage, said injector body having a high pressure seat between said actuation fluid inlet and said actuation fluid control passage and a ball positioned between said low pressure seat and said high pressure seat in contact with said pin.

5. The fuel injector of claim 3 wherein said hydraulic means for pressurizing includes:

said injector body having a plunger bore, a piston bore and an actuation fluid cavity that opens to said at least one actuation fluid inlet;

an intensifier piston positioned to reciprocate in said piston bore between a forward position and a return position;

a plunger positioned to reciprocate in said plunger bore between a retracted position and an advanced position; and a portion of said plunger bore and said plunger define a fuel pressurization chamber that is open to said nozzle chamber.

6. The fuel injector of claim 5 wherein said actuation fluid control valve further includes:

a pin attached to said first solenoid;

said injector body having a low pressure seat and a high pressure seat; and a ball positioned between said low pressure seat and said high pressure seat in contact with said pin.

7. The fuel injector of claim 6 wherein said injector body further includes a intensifier spool bore;

said actuation fluid control valve further includes a intensifier spool valve member having a end hydraulic surface, a hollow interior and at least one radial flow opening mounted to reciprocate in said intensifier spool bore between a first position and a second position;

said intensifier spool valve member opens said actuation fluid cavity to said actuation fluid inlet and closes said actuation fluid drain to said actuation fluid cavity when in said first position;

said intensifier spool valve member closes said actuation fluid cavity to said actuation fluid inlet and opens said actuation fluid drain to said actuation fluid cavity when in said second position; and means, including a spring positioned in said injector body, for biasing said intensifier spool valve member to said second position.

8. The fuel injector of claim 7 wherein said high pressure seat is between said intensifier spool control chamber and said actuation fluid inlet;

said low pressure seat is between said intensifier spool control chamber and said actuation fluid drain; and said intensifier spool valve member being hydraulically biased toward said first position when said ball is seated in said high pressure seat and said intensifier spool control chamber is open to said actuation fluid drain.

9. The fuel injector of claim 1 wherein said needle valve member includes an opening hydraulic surface exposed to pressure in said nozzle chamber;

said closing hydraulic surface and said opening hydraulic surface are sized and arranged such that said needle valve member is hydraulically biased toward said closed position when said needle control chamber is opened to said source of high pressure fluid.

10. The fuel injector of claim 9 further comprising a spring in contact with said needle valve member, for biasing said needle valve member toward said closed position when pressure in said nozzle chamber is below a valve opening pressure and said needle control chamber is opened to said low pressure passage; and said needle valve member is hydraulically biased toward said opened position when said needle control chamber is connected to said low pressure passage and pressure in said nozzle chamber is greater than said valve opening pressure.

11. The fuel injector of claim 1 wherein said needle valve member includes a needle portion with an opening hydraulic surface exposed to pressure in said nozzle chamber and an end portion with a closing hydraulic surface exposed to pressure in said needle control chamber.

12. A fuel injection system comprising:

a plurality of hydraulically actuated fuel injectors with direct control needle valves, each injector having hydraulic means for pressurizing fuel that includes an actuation fluid control valve with a first solenoid, a needle valve member with a closing hydraulic surface exposed to pressure in a needle control chamber and a needle control valve with a second solenoid that alternately opens said needle control chamber to a source of high pressure fluid or a low pressure passage, and each injector also having an actuation fluid inlet, an actuation fluid drain and a fuel supply passage;

a source of fuel connected to said fuel supply passage of each said injector;

a source of high pressure actuation fluid connected to said actuation fluid inlet;

a low pressure reservoir connected to said actuation fluid drain; and a computer in communication with and capable of independently controlling said needle control valve and said actuation fluid control valve.

13. The fuel injection system of claim 12 wherein said first solenoid and said second solenoid are two-way solenoids.

14. The fuel injection system of claim 12, wherein each said injector body further having a nozzle chamber and a nozzle outlet that opens to said nozzle chamber;

said actuation fluid control valve being movable between an open position in which said actuation fluid inlet is open and a closed position in which said actuation fluid inlet is closed;

said needle valve member being positioned to reciprocate in said nozzle chamber between an opened position in which said nozzle outlet is open and a closed position in which said nozzle outlet is closed;

said needle control valve being movable between an off position in which said needle control chamber is opened to said source of high pressure fluid and an on position in which said needle control chamber is opened to said low pressure passage.

15. The fuel injection system of claim 14 wherein said actuation fluid is lubricating oil.

16. The fuel injection system of claim 15 wherein said source of high pressure fluid is said actuation fluid inlet; and said low pressure passage opens to said actuation fluid drain.

17. The fuel injection system of claim 16 wherein each of said fuel injectors includes:

an injector body having said actuation fluid inlet, said actuation fluid drain, said fuel supply passage, an actuation fluid cavity, a piston bore and a plunger bore;

said actuation fluid control valve being mounted in said injector body and having a first position in which said actuation fluid cavity is open to said actuation fluid inlet and a second position in which said actuation fluid cavity is open to said actuation fluid drain;

an intensifier piston positioned to reciprocate in said piston bore between a forward position and a return position;

a plunger positioned to reciprocate in said plunger bore between a retracted position and an advanced position; and a portion of said plunger bore and said plunger define a fuel pressurization chamber that is open to said nozzle chamber.

18. The fuel injection system of claim 17 wherein said injector body includes an actuation fluid control passage extending between said needle control chamber and said needle control valve;

said needle control valve includes a pin attached to said second solenoid, said injector body having a low pressure seat between said actuation fluid drain and said actuation fluid control passage, said injector body having a high pressure seat between said actuation fluid inlet and said actuation fluid control passage and a ball positioned between said low pressure seat and said high pressure seat in contact with said pin.

19. The fuel injection system of claim 18 wherein said actuation fluid control valve further includes:

a pin attached to said first solenoid;

said injector body having a low pressure seat and a high pressure seat; and a ball positioned between said low pressure seat and said high pressure seat in contact with said pin.

20. The fuel injection system of claim 19 wherein said injector body further includes a intensifier spool bore;

said actuation fluid control valve further includes a intensifier spool valve member having a end hydraulic surface, a hollow interior and at least one radial flow opening mounted to reciprocate in said intensifier spool bore between a first position and a second position;

said intensifier spool valve member opens said actuation fluid cavity to said actuation fluid inlet and closes said actuation fluid drain to said actuation fluid cavity when in said first position;

said intensifier spool valve member closes said actuation fluid cavity to said actuation fluid inlet and opens said actuation fluid drain to said actuation fluid cavity when in said second position;

means, including a spring positioned in said injector body, for biasing said intensifier spool valve member to said second position;

wherein said high pressure seat is between said intensifier spool control chamber and said actuation fluid inlet;

said low pressure seat is between said intensifier spool control chamber and said actuation fluid drain; and said intensifier spool valve member being hydraulically biased toward said first position when said ball is seated in said high pressure seat and said intensifier spool control chamber is open to said actuation fluid drain.

* * * * *